United States Patent [19]

Piosenka et al.

[11] Patent Number: 4,993,068
[45] Date of Patent: Feb. 12, 1991

[54] UNFORGEABLE PERSONAL IDENTIFICATION SYSTEM

[75] Inventors: Gerald V. Piosenka, Scottsdale; Ronald V. Chandos, Tempe, both of Ariz.

[73] Assignee: Motorola, Inc., Schaumburg, Ill.

[21] Appl. No.: 441,573

[22] Filed: Nov. 27, 1989

[51] Int. Cl.$^5$ .............................................. H04K 1/00
[52] U.S. Cl. ...................................... 380/23; 380/30; 235/380; 340/825.34
[58] Field of Search ....................... 380/23, 24, 25, 30; 235/380; 340/825.34

[56] References Cited

U.S. PATENT DOCUMENTS

| | | |
|---|---|---|
| 3,896,266 | 7/1975 | Waterbury ............................. 380/23 |
| 4,438,824 | 3/1984 | Mueller-Schloer ................... 380/23 |
| 4,532,508 | 7/1985 | Ruell ................................ 340/825.34 |
| 4,785,290 | 11/1988 | Goldman ............................. 235/380 |
| 4,798,403 | 1/1989 | Nelson ................................. 235/380 |
| 4,825,050 | 4/1989 | Griffith et al. ....................... 380/29 |
| 4,853,522 | 8/1989 | Ogasawara ........................... 235/380 |

Primary Examiner—Thomas H. Tarcza
Assistant Examiner—David Cain
Attorney, Agent, or Firm—Frank J. Bogacz

[57] ABSTRACT

An unforgeable personal identification system for identifying users at remote access control sites. The unforgeable personal identification system generates one-way encrypted versions of physically immutable identification credentials (facial photo, retinal scan, voice and finger prints). These credentials are stored on a portable memory device (credit card size). At a remote access control site, the user presents his portable memory device and the encrypted identification credentials are read. The user then submits physically to inputting of his physical identification characteristics to the remote access control site. Comparison is performed with the credentials obtained from the memory device and with the user's physical identity to determine whether to allow or deny access at the remote site.

32 Claims, 4 Drawing Sheets

UNFORGEABLE PERSONAL IDENTIFICATION SYSTEM

BACKGROUND OF THE INVENTION

The present invention pertains to personal identification systems and more particularly to a system for the generation of unforgeable identification credentials and use of these unforgeable identification credentials at remote localized sites.

Modern society is continuously confronted with the problem of positive identification of individuals. Within the general populous, the problem is most frequently evidenced during everyday financial transactions such as, the use of credit cards, check cashing and automated tellers.

Within the government realm, the problem of identification is closely related to security issues involving access control. Various government agencies which handle classified information, as well as corporations which handle their own and others' confidential information, recognize the security issues. The U.S. Government and corporations spend much money to protect classified and confidential information. In response to the need for security, the government as well as individual corporations have provided forms of officially issued identification. Typically, the identification issued consists of an identification card imprinted with an individual's facial photograph. Some of these identification cards contain an additional magnetic strip which provides storage of digital data representing various information such as, employee number or security clearance level in a digital format. The information contained on this magnetic strip may be in encrypted or unencrypted form. Typically, magnetic card readers are provided at access control points. These card readers read the information, perform any necessary decryption and then either permit or deny access to materials or areas by unlatching door, gates, etc. For certain systems such as, banking or automatic teller systems, in addition to a magnetically encoded identification card, a user is required to enter a personal identification number (PIN). Any encrypted PIN number is then read from the identification card or a data base is accessed to retrieve a prestored PIN number. The PIN number which is retrieved is compared with the PIN number entered by the user. For detection of a comparison, access control is permitted. Otherwise, access control is denied. The PIN system and similar Password-based systems provide personal identification based on information "known" by the rightful user. All of these systems are defeated by extracting the known information from the rightful user, normally under duress, allowing the fraudulent user to pose as the rightful user.

Still other systems provide for security through the use of various user specific physical traits. These physical traits include fingerprints, retinal scans, voice patterns and dynamic signatures. Typically, these distributed access control points are linked via a communication medium to a centralized data base. The centralized data base serves as the repository for previously stored physical trait data, such as those mentioned above. The repository also provides for some form of comparison of the prestored traits with those obtained through the access control devices. A remote access control point transmits the data representing the physical trait which it has gathered through one of the above mechanisms to the central repository. The central repository then matches the data obtained from the remote access control point with the prestored data retrieved from the data base. If a successful comparison is obtained, the central repository then communicates back to the access control point to allow the requested access. Otherwise, the access is denied. Further, these systems may add encryption and decryption of the messages between the remote access control point and the central data base repository for security.

One such system as that described immediately above, is shown in U.S. Pat. No. 4,438,824, issued on Mar. 27, 1984, to C. Mueller-Schloer for an invention entitled "Apparatus and Method for Cryptographic Identity Verification".

Lost or stolen identification cards are a problem of some of the above-mentioned systems. Such systems depend heavily on the timely reporting of lost or stolen cards in order to update the data base. In the case of forged identification cards, the forgery may not be recognized for a considerable period of time resulting in a period of time during which there may be unauthorized use. This could result in heavy financial problems or the compromising of secret information.

In the systems which use physical trait identities and a centralized data base, these systems must maintain an online data base for communication with the remote access control points. Maintaining an on-line large data base and communication with remote sites for each access is very expensive, and poses intolerable access delays during periods of peak transactions. Also, they result in service outages if the central site or the communications medium fails.

In the government sector, the access control issue has not been handled in a centralized manner. Each agency such as, Army, Navy, Department of Energy, etc. has its own access control identification system. The lack of a centralized identification system has allowed the proliferation of unique non-interoperable methods for personal identification. Some of the methods are simple, while others are complex. However, these systems do not interact with one another.

Accordingly, it is an object of the present invention to provide a universally accepted personal identification system providing for low cost identification of personnel at remote access control points without the need of a large, on-line centralized data base to control each of the remote access control points. In addition to providing the personal identification, the invention also provides a means for conveying unforgeable privilege information associated with the user. This information can also be used to later audit or certify that the transaction was performed on behalf of a properly identified individual, and using provably valid attribute or privilege data.

SUMMARY OF THE INVENTION

In accomplishing the object of the present invention, a novel, unforgeable personal identification system is shown.

An unforgeable personal identification system positively identifies users at a remote access control site. The identification system includes apparatus for generating encrypted physically immutable identification credentials of a user. These credentials are then stored on a portable memory device.

The remote access control site reads the encrypted identification credentials from the portable memory device. Next, the user has his actual physical characteristics input to the access control site via a physical trait input device. Lastly, the identification credentials input directly from the user and those input via the portable memory device are compared. If the comparison is successful, the requested access is granted to the user. Otherwise, the requested access is denied by the remote access control site.

The above and other objects, features, and advantages of the present invention will be better understood from the following detailed description taken in conjunction with the accompanying drawings.

DESCRIPTION OF THE PREFERRED EMBODIMENT

The concept employed in the present invention utilizes modern public key or one-way cryptographic techniques to produce an unforgeable, yet verifiable, set or set of credentials. The set or sets of credentials are produced by encryption and decryption of immutable physical traits along with a digital set of attribute and privilege data, and a cryptographic checksum. The immutable physical traits are used to prove that the bearer of the credentials is indeed the person for whom the credentials were generated. The attribute or privilege data is used at the transaction site (as required by the particular transaction). The cryptographic checksum is used to positively ascertain that the credential was indeed generated by the valid authorization site and has not been tampered with after leaving the authorization site.

Some immutable physical traits, presently applicable to the personal identification system, include singly or in combination the following: facial photograph, retinal pattern, fingerprints (or hand prints, etc.), voice pattern, and static or dynamic personal signatures.

In general, the present personal identification system provides for an unforgeable, easily portable identifying credential or sets of credentials. In addition, the unit cost of a set or sets of credentials is quite low. The issued credentials must be highly reliable and have a relatively long life. Furthermore, updating information within the set or sets of credentials must be able to be done in a fairly rapid manner. Lastly, and perhaps most importantly, the credentials must be verifiable at a remote site or sites without access to a centralized data base.

The remote access control point verification equipment is a relatively low cost unit. This unit provides a high probability of authenticating proper use of identification credentials, of detecting unauthorized use of these credentials, and of rejecting forged or modified credentials.

Figure 1:
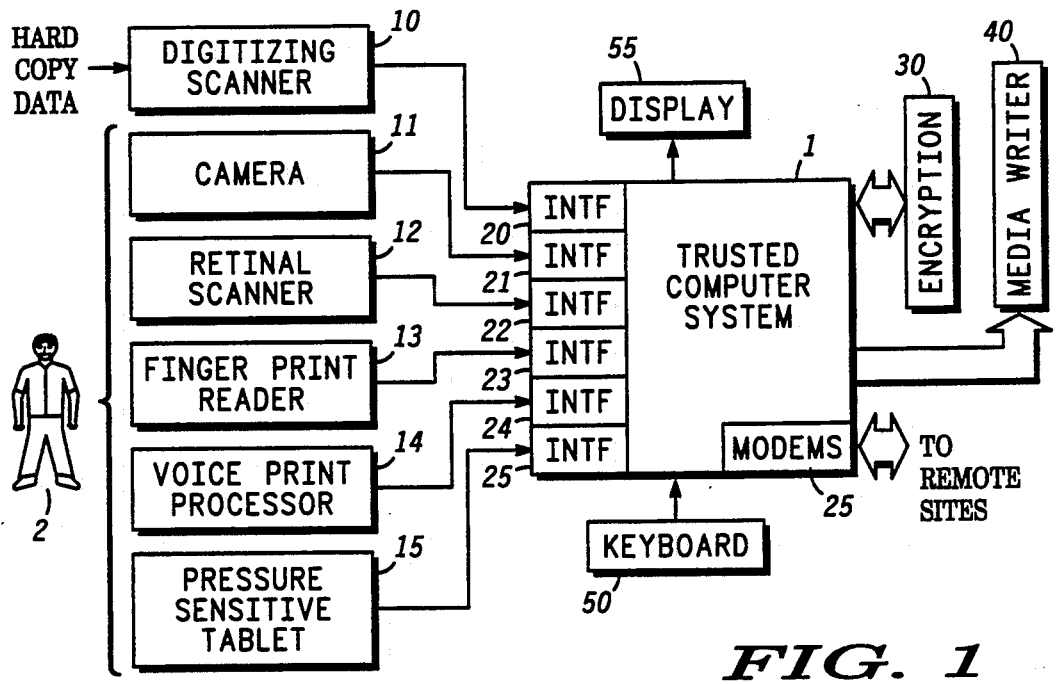
FIG. 1 is a block diagram of the authorization portion of an unforgeable personal identification system.

FIG. 1 depicts a block diagram of an authorization portion of the unforgeable personal identification system. The authorization portion or authorization site will include one or a limited number of sites that produce identification credentials. Identification credential generation requests and the appropriate data to form credentials may be gathered at these authorization sites. The information for forming these credentials may be provided to the authorization site from various remotely located information or data banks via electronic communication, mails or manually via input to the system. Trusted computer system 1 is the heart of the system. Trusted computer system 1 is connected to digitizing scanner 10 via an interface 20. Trusted computer system 1 is further connected to input camera 11 via interface 21, to retinal scanner 12 via interface 22, to fingerprint reader 13 via interface 23 and to voice print processor 14 via interface 24, and to pressure tablet 15 via interface 25.

Further, trusted computer 1 is connected via modems 25 to remote sites. These remote sites may input data to the trusted computer for generation of identification credentials or trusted computer 1 may transmit authorization information to remote sites. Trusted computer system 1 is further connected to encryption function 30. Information to be encrypted is sent from trusted computer 1 to the encryption function 30, and the resulting cipher text formed by the encryption function 30 are sent back to trusted computer 1. Trusted computer 1 is also connected to media writer 40 for the generation of encrypted, unforgeable personal identification credentials.

First, user 2, who is requesting the generation of identity credentials, presents himself to the authorization portion of the system shown in FIG. 1. Previously, the authorization portion of the system may receive other properly certified information about user 2. For example, existing methods to prepare security clearances are employed to provided this information. This may include direct background investigation by field agents of the authorization segment, obtaining information from public records and data bases, financial and tax records, and similar data related to user 2 requesting service. Based on the collected information, the authorization segment makes a decision whether to provide credentials or reject the request, with some or all of the collected information used within the user's attribute or privilege information set. The portion of the information used for the attribute or privilege information set may be entered into trusted computer 1 via keyboard 50. This information may be entered into the trusted computer system 1 via keyboard 50 or may be entered via digitizing scanner 10 through interface 20. Hard copy data may be input to digitizing scanner 10. Documentation may be presented to the digitizing scanner 10 for use in generating identity credentials of user 2, for example.

Next, the immutable physical traits of user 2 must be gathered through the various biometric devices 11 through 15. These biometric devices 11 through 15 produce information which is then digitized by interfaces 21 through 25 respectively and transmitted to the trusted computer system 1.

The credentials may include one or any combination of the physical traits provided by biometric devices 11 through 16. That is, user 2 may have his picture taken by camera 11 only. User 2 may have his picture taken by camera 11 and the retinas of his eyes scanned by retinal scanner 12. These two credentials may be used in combination to identify user 2. Further, user 2 may have his picture taken by camera 11, his eyes scanned by retinal scanner 12 and his fingerprints read by fingerprint reader 13. The identification credentials could then include three physical traits. Lastly, user 2 may have a voice print taken by voice print processor 14. This could also be used in combination with the other three physical traits mentioned above. In fact, any combination of one or more than one of the above-mentioned physical traits may be employed by this system. The benefit of multiple and combined sensors is twofold. First, it allows the authentication process to be performed with a higher confidence by basing the decision on a larger set of personal attributes. Next, it allows one authorization segment to support a community of verification sites (discussed later) each using a different combination of biometric trait sensors. These trait readers would be included not only at the authorization portion of the system shown in FIG. 1, but at the remotely located verification portion of the system, which is to be shown later.

Data from camera 11 is converted to digital data by interface 21. Data from retinal scanner 12 is converted to digital data by interface 22. Data from fingerprint reader (or palm print reader) 13 is converted to digital form by interface 23. Interface 24 converts the voice print data of voice print processor 14 to digital form. Interface 25 digitizes static and dynamic signature information received form pressure tablet 15.

Each of the digitized physical trait data which is required for identification by the system is then transmitted to the trusted computer system 1. This data is then formatted according to a specified predetermined format. In addition, data entered via the digitizing scanner 10 or keyboard 50 may be included in the data to be placed on the identification credentials. This optional attribute data may include information which the authorizing agency wishes to include as part of the credentials. Examples of this optional data are name, social security number, age, sex and hair color.

Other attribute or privilege information may be added to the credentials and coupled with the immutable physical traits. Such data may include medical information about the user, particular privileges held by the user, such as organizational affiliations (e.g. company, military, etc.), security clearance levels, passport and visa information, financial information, such as bank deposits, credit limitations or cash amounts which may be debited by various commercial institutions. The combination of the immutable physical trait data and the optional attribute and privilege data mentioned above, may be referred to as a composite data set (CDS).

After the physical trait data and other identification information has been collected and formatted by trusted computer system 1, it is ready for encryption. The composite data set is transmitted from trusted computer 1 to encryption apparatus 30. The encryption apparatus 30 may include a commercially available digital system capable of performing prescribed mathematical algorithms associated with such techniques known as public key cryptography. RSA-type public key cryptography techniques may be used. This technique uses separate and distinct cryptographic keys for the encryption process and a decryption process. These keys are one-way functions.

The encryption function operates upon the composite data set using a universal encryption variable ($U_e$) to create an encrypted version of the composite data set according to a prescribed mathematical algorithm.

Note that the attribute and privilege data set may be partitioned into a series of intersecting and non-intersecting data subsets on a "need to know" basis. That is, a financial subset could be created, which would include such things as bank deposits, credit limits or cash amounts which may be debited, and the existence of accounts at various institutes. A medical subset could include such things as blood type, medical history, and allergies to medication. Each data subset may be encrypted using a different encrypt key. The authorization segment holds and protects all encryption keys, but the decrypt portion of the key pairs are made available to the validation segment sites on a "need to know" basis corresponding to partitioned data subsets.

For example, a financial institution validation site would be given the decrypt key(s) for the applicable biometric trait data used to recognize the presenter of the credentials, and the separate and distinct decrypt key for the financial data subset. The financial institution would not be given the decryption key(s) required to recover the medical data subset. Therefore, attribute and privilege data can be separated on a "need to know" basis by controlling the distribution of decryption keys.

This cryptographic separation would prevent those verification sites, such as a company, from obtaining information about the financial status of a particular user and vice versa. In this way, validation sites for one particular function are unaware that the credential holder or user possess any other special privileges.

The encrypted CDS represents the unforgeable credentials for a particular user, such as user 2. The encrypted CDS is then transmitted from encryption apparatus 30 to trusted computer 1, where additional plain text may be added. The resulting combination of cipher text and plain text is transmitted from trusted computer 1 to media writer 40, where the credentials are produced in hard copy and given to user 2.

In the preferred embodiment, this hard copy of the user's credentials is written on to a "credit card" sized card having memory by media writer 40. Many forms of a digital storage medium are available to be used with this system. These digital storage media include the following types: magnetic card strips; electronic memory cards (RAM, PROM, EPROM and EEPROM); and optical card memories. In addition, other storage media, such as computer floppy discs may be utilized.

As an alternate to preparing the encrypted composite data set on a hard memory medium, the encrypted CDS may also be sent from trusted computer 1, via modem 25 to one or more remote sites. The media writer function 40 would be provided at the remote sites, as well be described later.

Since the encryption function using the universal encryption variable is a one way function, the decrypt keys may be published. This allows the validation portion of the system to decrypt the composite data set, but does not allow the validation portion to determine what encrypt key was used to produce the encrypted CDS. Nor does possession of the decrypt key by the validation segment permit this site to generate an unauthorized or illegal set of credentials for another individual. Possession of the decrypt key does not provide a means whereby the validation site could modify or tamper with the information contained on the medium in a way which would be undetectable when the modified media is subsequently used.

The encryption process performed on the CDS by encryption function 30 may involve two different methodologies depending upon the quantity of information to be encrypted. For small data packets (less than a few thousand bits), the CDS will be directly encrypted using the public key encryption technique.

For CDS packets of length greater than a few thousand bits, an additional processing step is performed by the encryption apparatus 30. This step is used, since it is computational difficult and time consuming to encrypt and decrypt long messages using public key cryptography techniques. A digital signature for the composite data set is created. This digital signature is much shorter than the entire CDS. This digital signature may be created using conventional hash summing or check summing algorithms to produce a unique signature for the CDS. The nature of the hash sum or check summing algorithm is such that the modification of more and more bits of the original message will result in an extremely high probability that the digital signature of the modified block will differ from the digital signature of the unmodified block. The resulting digital signature is encrypted by encryptor 30 and sent to trusted processor 1. Trusted processor 1 concatonates the encrypted digital signature with the rest of the data set and sends the resulting information to media writer 40 for placement on hard copy medium. The media containing the encrypted composite data set now serves as the identification credential for a particular user such as user 2.

Display device 55 may be provided to display data entered into trusted computer system 1. Data, such as hard copy data, entered through digital scanner 10 or photographic data taken by camera 11 or keyboard input via keyboard 50, may be displayed on display device 55 to verify that the correct information has been obtained via trusted computer system 1.

Figure 2:
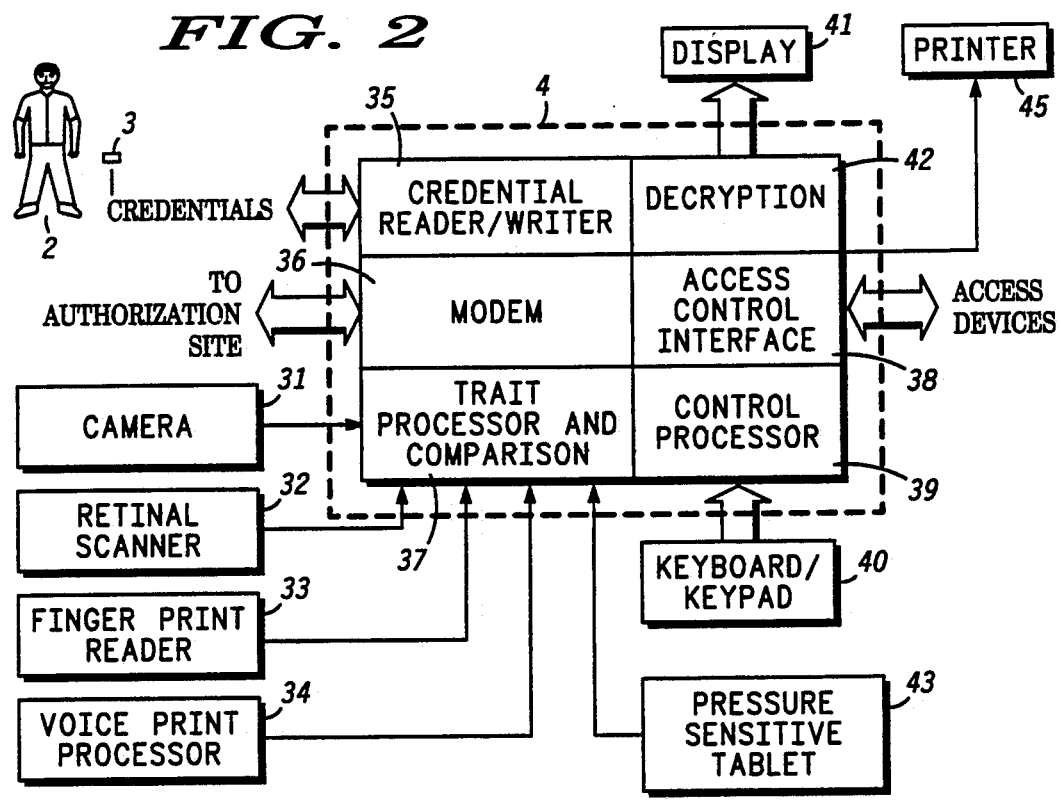
FIG. 2 is a block diagram of the verification portion of an unforgeable personal identification system.

The verification portion of the unforgeable personal identification system includes a number of verification sites, one of which is shown in FIG. 2. The verification portion of the personal identification system (or verification site) provides for identification or access control functions based upon the presentation of the identification credentials. The verification site shown in FIG. 2 provides the ability to verify that the presenter of the media is the individual to whom the media was issued. The verification site may also extract, display, and/or use the individual's optional data of the composite data set which may include data indicating certain privileges or accesses of the user.

The heart of the verification portion of the personal identification system is the processor 4. Processor 4 may include the credential reader 35, modem 36, trait processor and comparison logic 37, access control interface 38 and control processor 39. These items are commercially available items. In addition, a keyboard or keypad 40 may be included and a display 41 are connected to the processor 3.

The verification site may also include one or more of the physical trait input devices 31 through 34. These devices correspond to the input devices at the authorization site, but need not include all of the sensors used at the authorization site. Camera 31, retinal scanner 32, fingerprint reader (palm print reader) 33 and voice print processor 34 are each connected to the trait processor and comparison unit of processor 4. The verification site may contain any one or more of these physical trait input devices 31 through 34. For low cost applications, the verification site would typically contain just one of the input devices, such as camera 31.

Modem 36 is connected through a communications network to the authorization site. Credentials may be passed between the sites under cryptographic key optionally in this system. Access control interface 38 provides outputs to control access of user 2 to certain facilities. The access control interface may be a door or a gate opener or other control mechanism.

User 2 presents his credentials 4 to the credential reader 35. The credentials 3 were those prepared at the authorization site and reside in a credit card-type memory card or computer disc, etc. Credential reader 35 reads the identification medium and passes the composite data set to decryption function 42. The decryption function 42 utilizes one or more of the universal decryption variables ($U_d$) and a particular mathematical algorithm to decrypt the data. Decryption function 42 then recovers the composite data set in unencrypted form. Since the universal decryption variable or key is published, many verification sites may use this decryption key.

For the case of a large data set, the decryption function 42 decrypts the digital signature which validates the composite data set. The decryption function 42 produces the original unencrypted version of the composite data set which includes: the physical trait data and any optional or supplemental data. If the data is properly recovered by encryption function 42, it is determined that the data obtained from the credentials 3 of user 2 was generated by the authorization portion of the personal identification system.

Next, one or more of the physical trait input devices 31 through 34 are used by user 2 to provide input to the trait processor and comparison logic 37. As can be seen, by using only one of the physical trait input devices, the verification portion of the personal identification system may be quite inexpensive which is one of the objects of the present invention. User 2 may have his picture taken by camera 31 and the camera input is passed to trait processor 37. Further, user may submit to a retinal scan by retinal scanner 32 and this information would be passed to trait processor 37. A fingerprint of user 2 may be taken by fingerprint reader 33 and the data passed to trait processor 37. In addition, a voice print of user 2 may be taken by voice print processor 34 and this data passed to trait processor 37.

The portion of the composite data set related to the identification credentials is passed from decryption function 42 to trait processor and comparison 37. Trait processor and comparison logic 37 then compares the set of data obtained from decryption function 42 which was read from the credentials card 3 with the information obtained from one or more of the physical trait input devices 31 through 34. Trait processor and comparison then digitally compares the two sets of identification data. Conventional pattern matching techniques are employed by comparison logic 37. The result of this comparison is the decision whether the user 2 is physically the same individual as that described on the media card 3. If this is so, it may be assumed that the other information contained on the credentials card 3 can be trusted to correctly describe the attributes and privileges of the person bearing the credentials card 3. In one form of the invention, if the comparison is positive, trait processor and comparison logic indicates this to the access control, interface 38. The access control interface then would open a door or a gate, for example.

As can be seen, this system may be shaped to provide different kinds of output and thereby the system may be tailored to whatever cost the system operator is willing to put forth.

In cases where the validation site inherently requires a human operator (example, checkout counter at a department store), the complexity of the validation segment can be further reduced by eliminating both the sensors (31 through 34 and 43) and trait comparison logic 37. In this example, the facial feature biometric is used for user 2 identification, with the decrypted image displayed to the human operator via display 41. The human operator serves both the sensor 31 and comparison 37 function, determining if the user 2 features match those decrypted from the medium presented by the user. The attribute and privilege data (in this example, credit limit) is also displayed to the operator via display 41, and is used to make a decision whether to allow the transaction. Thus, the operator also performs the access control interface (or new phrase selected for this block) 38.

In a slightly more complex system, if a personal identification number were encrypted upon the credentials card 3, user 2 would also have to enter a PIN number via keyboard or keypad 40. The system would then compare these to numbers digitally and provide a further security check upon the status of user 2. It can be seen from the above that the verification portion of the system is very flexible. Such flexibility may provide great cost savings to some systems and allow a very high level of security for other systems.

Note also the the authorization segment may support a large community of different validation sites, each serving a different function, using different biometric sensors, and each responding to a different subset of the attribute and privilege data set. Yet, the validated user 2 is issued one multi-purpose media containing multiple data records related to only the validation sites required for his privilege set.

Within the biometric sensors, certain sensors are more amenable to human decision validation (example facial features, voice characteristics). Others are more amenable to machine comparison (example fingerprint and retinal scan), while others are amenable to both (example voice characteristics).

That is, one individual may carry a media which has biometric data obtained from camera sensor 11 and fingerprint reader 13, and attribute data related to security clearance and financial transactions, with each record covered in a different encrypt key. When the individual presents this media at a point of sales terminal, for example, the facial feature biometric and financial attribute data would be decrypted and used to allow or disallow the requested transaction. When the same medium is presented at the guard station of a military base, perhaps both the facial information and the fingerprint biometric would be decrypted. The facial features could be scanned both by camera 31 and the guard at the gate, and the fingerprint sample taken from the presenter by fingerprint reader 33. Both the human guard and the validation site processor 4 would come to a consensus whether to allow entry, and accept the individual's claimed security privileges extracted from the security clearance subset of the composite data set.

Note in these examples that the point of sales terminal does not possess the decrypt key for the fingerprint record or security record, but does possess the decrypt key for facial features and financial data. Similarly, the guard station validation equipment possesses keys for facial features, fingerprints, and security data, but not for financial data.

Another application of the verification site is to produce a "log" function. This log function is a record of those who have had access to a particular area. This automatic log function replaces the current sign in and sign out procedures utilized widely. Control processor 39 may provide a log record of these accesses on a hard disc or diskette (not shown) or a printer (also not shown).

As can be seen from the above description, the verification site of the Applicant's system may operate autonomously from the authorization site. That is, for each user presenting himself to the verification site, a message is not sent to the centralized data base of the authorization site. Further, a message need not be sent back to the verification site (although this feature is supported by the present system). The data base of the authorization site of the Applicant's invention need not be on-line twenty-four hours per day. Its functions need not be on-line at all with respect to the verification sites. Each user 2 carries with him or her the credentials card 3 which has been prepared cryptographically by the authorization site. This allows verification sites to operate autonomously and not require connection with a large centralized data base.

The validation segment optionally contains a printer 45 allowing information to be printed at the transaction site. This feature is applicable to validation sites involving financial transactions such as check cashing. In this instance, information extracted from the unforgeable financial privilege data subset could be physically written onto the transaction receipt (example—the tendered check itself). This would result in a hard copy record that user 2 was properly authenticated and his privileges validated prior to completing the requested transaction or service. Often, this function is now manually performed by physically writing onto the transaction record by the operator at the transaction site.

Figure 3A:
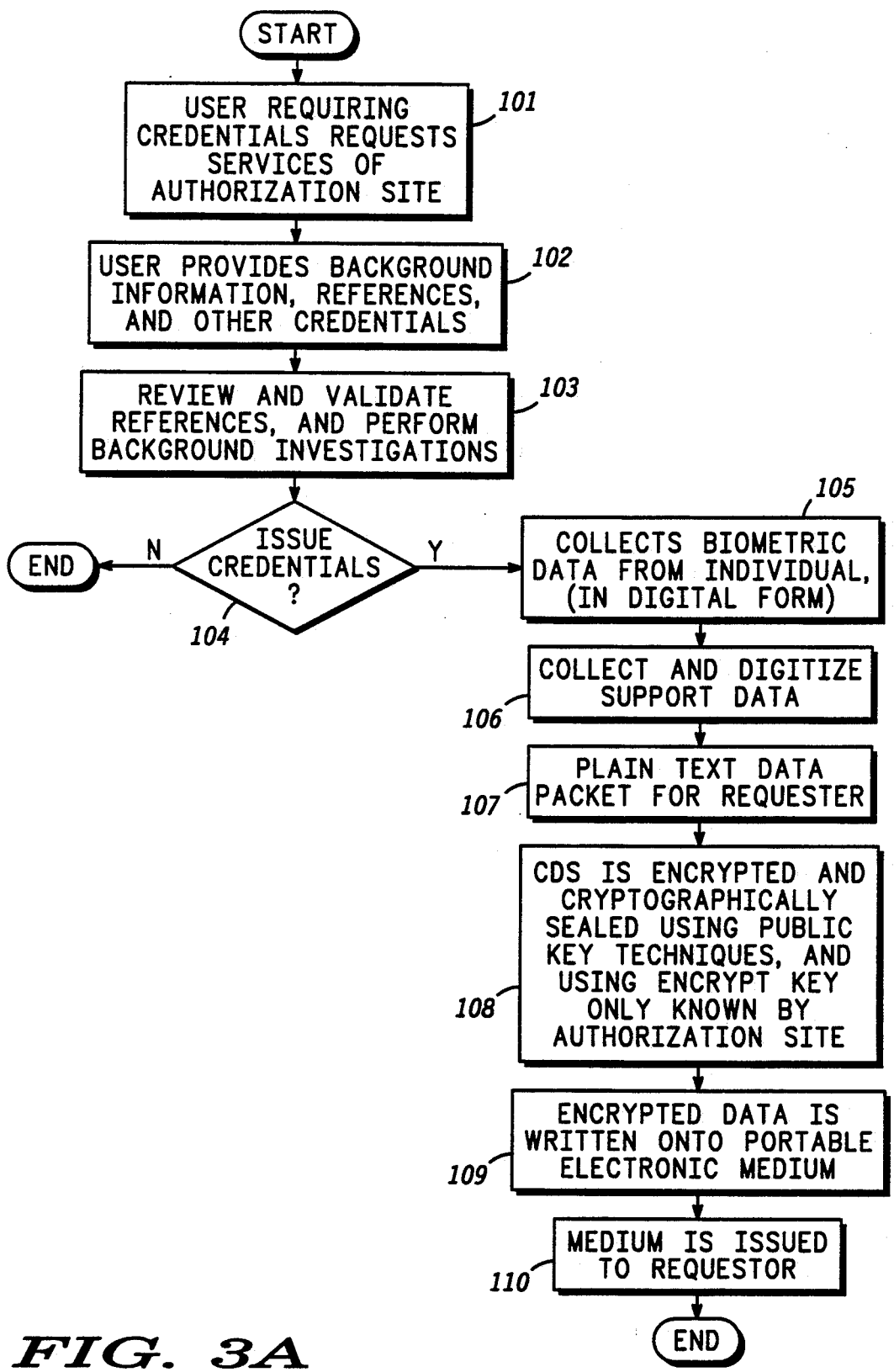
FIGS. 3A and 3B are a flow chart diagram of the method for an unforgeable personal identification system.

Referring to FIG. 3A, a flow chart of the processing of the authorization portion of the unforgeable personal identification system is shown. The authorization procedure is begun and block 101 is entered. Block 101 receives the request of the user who requires credentials. Next, the user must provide the appropriate background information, references and other credentials to the authorization site, block 102. Such credentials may include birth certificates, security clearances, credit records, military records, etc. Next, these records are reviewed and validated. Any background checks required, such as those for security clearances, are provided, block 103. The authorization site then determines whether, as a result of the investigations, to issue the credentials, block 104. If the background information is unable to be confirmed, the N path is followed from block 104 and the process is ended. A denial request is generated. If the credentials are approved, the request is approved and the Y path is followed from block 104 to block 105. Block 105 collects the biometric data from the individual. This data is placed into digital form.

Next, block 106 collects any supporting data and digitizes this data. Such data includes security clearances, financial records, employee identification, etc.

Next, a plain text data package is generated for the requestor. This data packet is displayed and the authorization site personnel may determine positive proof of who the requestor is and what his privileges are. Next, the composite data set which is created is encrypted and cryptographically sealed. Public key techniques are employed using a one-way encryption function, block 108.

Then, the encrypted CDS is written onto a portable memory medium, block 109. This medium may typically include credit card sized memories as mentioned above. Lastly, the identification medium is issued to the requestor, block 110. Then the procedure is ended.

Figure 3B:
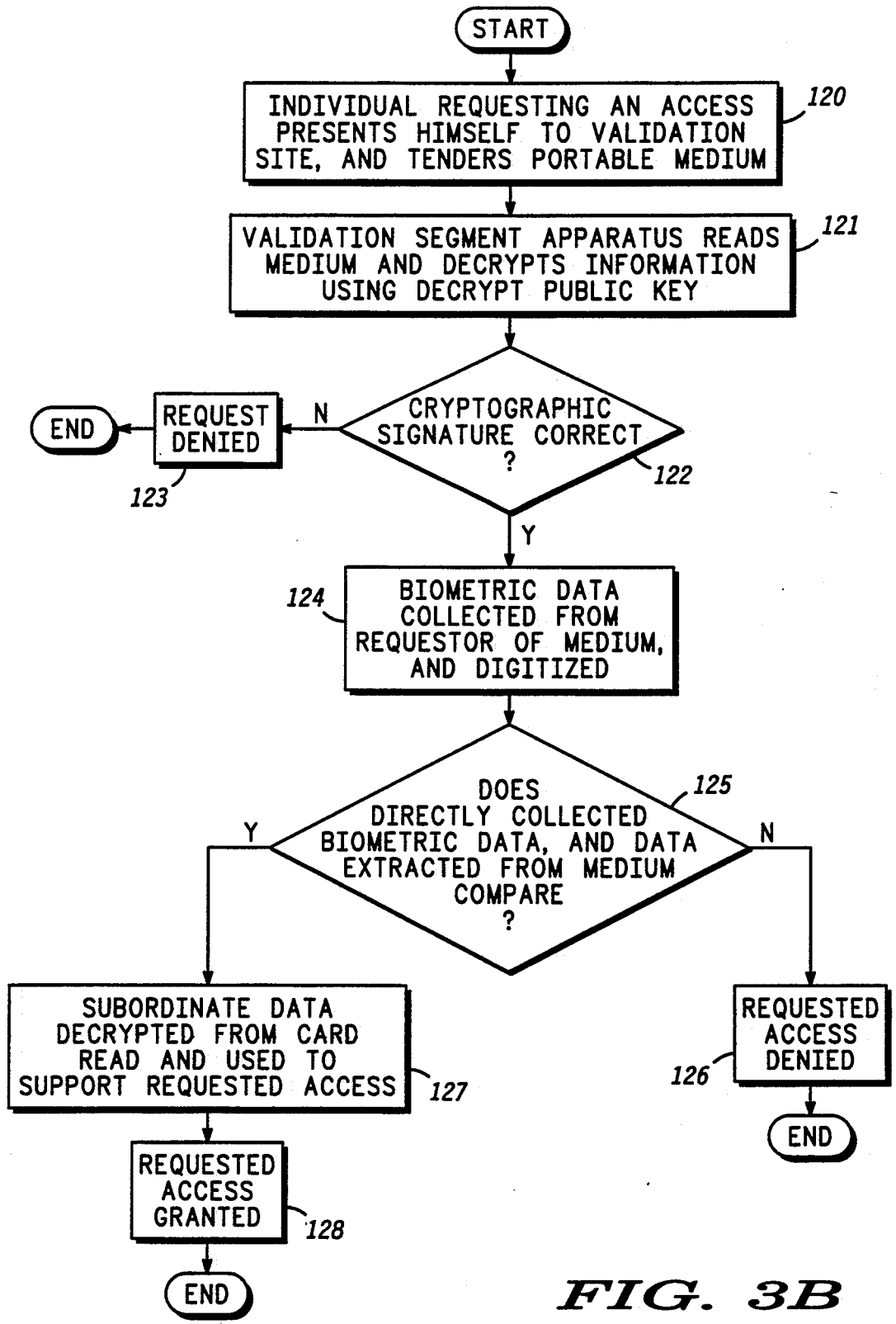

FIG. 3B depicts the validation site procedure for an unforgeable personal identification system. The validation portion of the procedure is started and block 120 is entered. The individual who is requesting access presents himself to the validation site and enters the portable memory medium into a reader, block 120. Next, block 121 reads the memory medium and decrypts the information using the public decryption key. Block 122 determines whether the cryptographic signature it calculates matches the cryptographic signature recorded on the memory medium. If the two cryptographic signatures do not match, block 122 transfers control to block 123 via the N path. The request is denied and the process ended.

If the signatures compare, block 122 transfers control to block 124. Block 124 collects the biometric data from the requestor and digitizes this data. That is fingerprints, photographs, retinal scans or voice prints are taken at the remote validation site and digitized. Next, block 125 determines whether the biometric data collected from the requestor at the validation site compares with the biometric data encrypted on the credit card-type (portable memory medium) credential. If the two sets of biometric data do not match, block 125 transfers control to block 126 via the N path. Block 126 denies the access request and ends the procedure.

If the two sets of biometric data compare, block 125 transfers control via the Y path to block 127. Block 127 decrypts a subordinate or optional data from the composite data set. This data is used to support the requested access. Next, block 128 grants the requested access. Then the process is ended.

Figure 4:
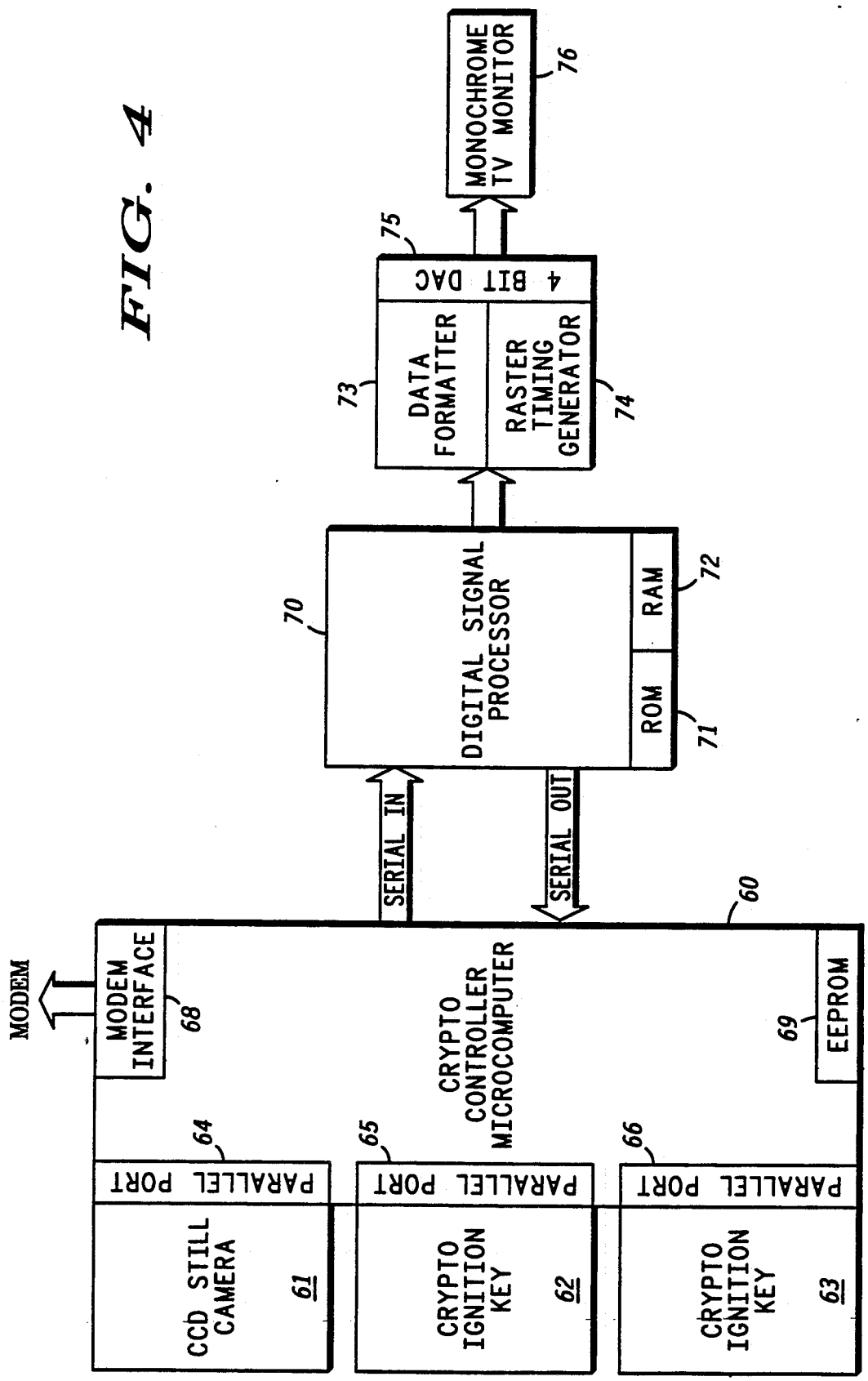
FIG. 4 is a block diagram of a particular embodiment (facial photograph) of the verification portion of an unforgeable personal identification system.

FIG. 4 is an example of a possible implementation for a verification site. Still camera 61 is connected via parallel port 64 to crypto controller microcomputer 60. Similarly, crypto ignition key 62 is connected through parallel port 65 to microcomputer 60. Memory card reader 63 is connected via parallel port 66 to microcomputer 60. Microcomputer 60 also includes modem interface 68 and EEPROM 69. Microcomputer 60 is connected to digital signal processor 70 via the serial in and serial out buses. Digital signal processor 70 is connected to ROM 71 and RAM 72. Digital signal processor 70 is connected via a 24-bit bus to data formatter 73 and raster timing generator 74. Raster timing generator 74 and data formatter 73 are connected via 4-bit digital-to-analog converter (DAC) 75 to monochrome TV monitor 76.

Crypto controller microcomputer 60 may be implemented with an integrated circuit Part No. 68HC11. Digital signal processor may be implemented with a integrated circuit Part No. DSP56001.

Camera 61 takes a picture of the user. Cryptographic keys are input into the system via crypto ignition key 62. Memory card reader accepts the user's identification credentials. Microcomputer 60 then operates to decode the composite data set of the credentials. The information is passed along to digital signal processor 70 from microcomputer 60. The visual picture encoded on the credentials card is processed for visual display by digital signal processor 70. The picture is then transmitted to data formatter 73. Timing generator 74 produces the necessary timing to operate TV monitor 76. The data is then transmitted via the digital-to-analog converter 75 to be displayed upon the monitor 76.

In the case of a human guard, he would examine monitor 76 and the individual and then make the comparison to determine whether the individual was properly identified and therefore permitted access. For the automatic validation, the camera picture of camera 61 would be compared digitally with the picture of the credentials card by digital signal processor 70. An indication of the status of this comparison would then be output on monitor 76.

Although the preferred embodiment of the invention has been illustrated, and that form described in detail, it will be readily apparent to those skilled in the art that various modifications may be made therein without departing from the spirit of the invention or from the scope of the appended claims.

We claim:

1. An unforgeable personal identification system for identifying users at remote access control sites, said unforgeable personal identification system comprising:
   means for generating encrypted physically immutable identification credentials of a user;
   said means for generating including processor means for processing digital data;
   text input means connected to said processor means, said text input means for transmitting text data including privilege information to said processor means in digital form;
   means for encrypting said physically immutable identification credentials and said text data according to a predefined one-way encryption algorithm to produce encrypted identification credentials;
   portable memory means for storing said encrypted identification credentials;
   said remote access control site including:
     means for reading said encrypted identification credentials from said portable memory means;
     means for directly inputting physically immutable identification of said user;
     means for comparing said input physically immutable identification of said user with said identification credentials read from said portable memory means, said means for comparing further operating to indicate a successful or an unsuccessful comparison of said directly input identification credentials of said user with said identification credentials of said user from said portable memory means and to allow an access by said user according to said privilege information, if said comparing is successful.

2. An unforgeable personal identification system as claimed in claim 1, said means for generating including:
   means for collecting said physically immutable identification of said user, said means for collecting being connected to said processor means, said means for collecting operating to transmit said physically immutable identification of said user to said processor means; and
   means for converting said physically immutable identification to digital form, said means for converting being connected between said processor means and said means for collecting.

3. An unforgeable personal identification system as claimed in claim 2, wherein there is further included keyboard means connected to said processor means, said keyboard means for transmitting text data to said processor means.

4. An unforgeable personal identification system as claimed in claim 3, wherein said means for encrypting includes one-way cryptographic means.

5. An unforgeable personal identification system as claimed in claim 4, wherein said one-way cryptographic means includes one-way RSA-type public encryption means.

6. An unforgeable personal identification system as claimed in claim 3, wherein there is further included media writing means connected to said means for encrypting, said media writing means operating to store said encrypted identification credentials in said portable memory means.

7. An unforgeable personal identification system as claimed in claim 6, wherein said means for collecting includes video camera means.

8. An unforgeable personal identification system as claimed in claim 6, wherein said means for collecting further includes retinal scanner means.

9. An unforgeable personal identification system as claimed in claim 6, wherein said means for collecting further includes fingerprint reading means.

10. An unforgeable personal identification system as claimed in claim 6, wherein said means for collecting further includes voice print processor means.

11. An unforgeable personal identification system as claimed in claim 6, wherein said means for collecting further includes pressure sensitive tablet means for providing a dynamic signature.

12. An unforgeable personal identification system as claimed in claim 6, wherein there is further included:
  modem means connected to said processor means and connected to said remote sites via a communication system, said modem means operating to transmit and to receive said encrypted data between said remote sites and said processor means; and
  display means connected to said processor means, said display means operating to output said text data and said physically immutable identification for observation.

13. An unforgeable personal identification system as claimed in claim 12, wherein said remote access control site further includes means for decrypting said encrypted identification credentials from said portable memory means, said means for decrypting being connected to said means for reading.

14. An unforgeable personal identification system as claimed in claim 13, wherein said means for directly inputting includes video camera means.

15. An unforgeable personal identification system as claimed in claim 13, wherein said means for directly inputting further includes retinal scanning means.

16. An unforgeable personal identification system as claimed in claim 13, wherein said means for directly inputting further includes fingerprint reader means.

17. An unforgeable personal identification system as claimed in claim 13, wherein said means for directly inputting further includes voice print processor means.

18. An forgeable personal identification system as claimed in claim 13, wherein said means for directly inputting further includes pressure sensitive tablet means for providing a dynamic signature.

19. An unforgeable personal identification system as claimed in claim 13, wherein said remote access control site further includes access control interface means connected to said means for comparing, said access control interface means operating to allow an access of said user in response to a successful comparison and said access control interface means being further operated in response to an unsuccessful comparison to deny access to said user.

20. An unforgeable personal identification system as claimed in claim 19, wherein said remote access control site further includes control processor means for controlling the operation of said remote access control site, said control processor means being connected to said means for reading, to said means for said inputting, to said means for comparing, to said means for decrypting and to said access control interface means.

21. An unforgeable personal identification system as claimed in claim 20, wherein said remote access control site further includes:
  modem means connected to said control processor means and to said processor means via said communication system, said modem means operating to transmit said encrypted identification credentials between said remote access control site and said processor means;
  keyboard means connected to said control processor means, said keyboard means for inputting data to said remote access control site;
  display means connected to said means for decrypting, said display means operating to provide for observation of said physically immutable identification credentials of said user at said remote access control site; and
  printer means connected to access control interface means for providing a hard copy record of said access.

22. A method for unforgeable personal identification having an authorization site and at least one remote access control site for allowing or denying access of a user, said method for unforgeable personal identification comprising the steps of:
  collecting physically immutable identification credentials from said user;
  transmitting, by an input device, to a processor text data including privilege information in digital form;
  encrypting said physically immutable identification credentials and said text data according to a predefined one-way encryption algorithm to produce encrypted identification credentials;
  issuing a portable memory device including said encrypted identification credentials to said user;
  said method for unforgeable personal identification further including at the remote access control site the steps of:
  reading said encrypted identification credentials from said portable memory device of said user;
  obtaining said physically immutable identification credentials directly from said user;
  comparing said physically immutable identification credentials obtained from said portable memory device with said physically immutable identification credentials obtained directly from said user; and
  allowing an access according to said privilege information, if said comparing is successful.

23. A method for unforgeable personal identification as claimed in claim 22, wherein there is further included at the remote access site the step of decrypting said encrypted physically immutable identification credentials.

24. A method for unforgeable personal identification as claimed in claim 23, wherein said steps of decrypting and encrypting utilizing a one-way cryptographic algorithm include using an RSA-type cryptographic algorithm.

25. A method for unforgeable personal identification as claimed in claim 23, wherein there is further included at the remote access control site the step of denying said access to said user, if said comparison is unsuccessful.

26. A method for unforgeable personal identification as claimed in claim 25, wherein there is further included at the authorization site the steps of:
provdetermining background information relative to said user;
validating said background information of said user; and
second denying said user said portable memory device, if said background information is improper.

27. A method for unforgeable personal identification as claimed in claim 26, wherein said step of collecting further includes the step of:
second collecting supporting text data of said user; and
preparing a plain text data packet for said user.

28. A method for unforgeable personal identification as claimed in claim 27, wherein said step of encrypting further includes the steps of:

second encrypting said plain text data packet; and
writing said encrypted plain text data packet and said encrypted physically immutable identification credentials to said portable memory device.

29. A method for unforgeable personal identification as claimed in claim 28, wherein there is further included at said remote access control site the steps of:
determining whether said encrypted physically immutable identification credentials and data of said portable memory device have been properly decrypted; and
denying said access to said user for improper decryption.

30. A method for unforgeable personal identification as claimed in claim 29, wherein there is further included at said remote access control site the step of utilizing said decrypted text information to support the access of said user.

31. A method for unforgeable personal identification as claimed in claim 30, wherein there is further included the step of placing an expiration data upon said encrypted physically immutable identification credentials.

32. A method for unforgeable personal identification as claimed in claim 31, wherein there is further included at said remote access control site the steps of:
reading said expiration data of said credentials;
determining whether said credentials are valid; and
rewriting said encrypted physically immutable identification credentials with an indication that said credentials are expired for inhibiting further use of said credentials.

* * * * *